United States Patent
Steverson et al.

(10) Patent No.: US 10,797,946 B2
(45) Date of Patent: Oct. 6, 2020

(54) PROVISIONING A NETWORK DEVICE

(71) Applicant: ADTRAN, Inc., Huntsville, AL (US)

(72) Inventors: Walt Steverson, Huntsville, AL (US);
Patrick A. Price, Madison, AL (US);
Seethalakshmi Gopalasubramanian, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/939,706

(22) Filed: Mar. 29, 2018

(65) Prior Publication Data

US 2019/0306018 A1    Oct. 3, 2019

(51) Int. Cl.
*G06F 15/173* (2006.01)
*H04L 12/24* (2006.01)
*H04L 29/08* (2006.01)

(52) U.S. Cl.
CPC .......... *H04L 41/0806* (2013.01); *H04L 41/12* (2013.01); *H04L 67/10* (2013.01)

(58) Field of Classification Search
CPC . H04L 41/0806; H04L 41/0803; H04L 45/74; H04L 41/0226; H04L 69/22; H04L 45/02
USPC .......... 709/223, 224, 230, 236, 217
See application file for complete search history.

(56) References Cited

U.S. PATENT DOCUMENTS

| | | | | |
|---|---|---|---|---|
| 2005/0135365 A1* | 6/2005 | Sung | ...................... | H04L 12/18 370/390 |
| 2014/0149542 A1* | 5/2014 | Luo | ...................... | H04L 45/02 709/217 |
| 2014/0169367 A1* | 6/2014 | Tsym | ...................... | H04L 45/74 370/392 |
| 2016/0248511 A1* | 8/2016 | Wang | .................. | H04L 41/0803 |
| 2016/0308759 A1* | 10/2016 | Feng | ...................... | H04L 45/38 |
| 2017/0041229 A1* | 2/2017 | Zheng | ..................... | H04L 69/22 |
| 2018/0115470 A1* | 4/2018 | Huang | ............... | H04L 41/0873 |

OTHER PUBLICATIONS

Hoover, John. "What Is the Key Difference between PON, POL, GPON and OLAN?" What Is the Key Difference between PON, POL, GPON and OLAN?, Jul. 21, 2017, blog.tellabs.com/blog/what-is-the-difference-between-pon-pol-gpon-and-olan. (Year: 2017).*

\* cited by examiner

Primary Examiner — Kaylee J. Huang
(74) Attorney, Agent, or Firm — Fish & Richardson P.C.

(57) ABSTRACT

Methods, systems, and apparatus for provisioning a network device are disclosed. In one aspect, a message is received by a translation device from a controller. A determination is made, by the translation device, that the received message includes data that is destined for multiple different downstream network devices. A determination is made that a first downstream network device among the multiple different downstream network devices is incapable of being provisioned using a communications protocol of the received message. Data from the received message, that is destined for the first downstream network device, is translated, by the translation device, from the communications protocol of the received message to a translated message defined in a different protocol that is required to provision the first downstream network device. The translated message is transmitted, by the translation device, to the first downstream network device according to the different protocol.

14 Claims, 7 Drawing Sheets

PROVISIONING A NETWORK DEVICE

BACKGROUND

This specification relates to provisioning a network device in a Software Defined Network (SDN).

Access networks are transitioning to using Software Defined Networking technology. However, in some access networks, there is a heterogeneous deployment of network devices, resulting in some network devices supporting different functionality than other network devices. For example, some network devices are capable of communicating in an OpenFlow protocol, while other network devices are not capable of communicating in the OpenFlow protocol. In addition, by specification, some network devices are explicitly managed and/or controlled by a particular type of protocol different from the OpenFlow protocol.

SUMMARY

In general, one innovative aspect of the subject matter described in this specification can be embodied in methods for provisioning a legacy network device in a Software Defined Network (SDN). One example computer-implemented method includes receiving, by a translation device, a message from a controller, determining, by the translation device, that the received message includes data that is destined for multiple different downstream network devices, determining that a first downstream network device among the multiple different downstream network devices is incapable of being provisioned using a communications protocol of the received message, translating, by the translation device, data from the received message that is destined for the first downstream network device from the communications protocol of the received message to a translated message defined in a different protocol that is required to provision the first downstream network device, and transmitting, by the translation device, the translated message to the first downstream network device according to the different protocol.

Particular embodiments of the subject matter described in this specification can be implemented so as to realize one or more of the following advantages. For example, the methods, devices, and/or systems described in the present disclosure can be used to provision a network device in an SDN that includes devices that support different functionality (e.g., where some devices can communicate using a particular protocol and other can't communicate using the particular protocol). For instances, a translation device can receive a message from a controller device, and determine that data included in the message is destined for a particular network device that is incapable of being provisioned using a communications protocol of the received message. In response to the determination, the translation device automatically translates data, from the received message that is destined for the particular network device, from the communications protocol of the received message to a translated message defined in a different protocol that is required to provision the particular network device. The translation device then transmits the translated message, rather than the received message, to the particular network device, according to the different protocol. In doing so, the particular network device can be provisioned without the need of an additional provisioning mechanism. As a result, currently deployed network devices (e.g., legacy network devices) do not need to be modified, while enabling Software Defined Networking.

Additionally, the solutions presented in this document are capable of presenting a particular Table Type Pattern (TTP) northbound towards the controller device (e.g., an SDN Controller) that represents aggregate packet manipulation and control capabilities of all devices south of the translation device (e.g., southbound towards the network devices). In addition, the translation device is capable of translating the model presented within the northbound TTP to a variety of southbound protocols in order to provision the southbound devices using an SDN framework, irrespective of the particular protocols used by the southbound devices. As discussed in more detail below, the translation device can communicate with a southbound device using OpenFlow when the southbound device is capable of being configured using OpenFlow, and can communicate with the southbound device using another protocol when the southbound device is not capable of being configured using OpenFlow. Thus, the present solution enables a single translation device to provision various different devices even when those devices support different protocols and a standardized provisioning scheme (e.g., G.984.4, G-PON Optical Network Terminal (ONT) management and control interface (OMCI) specification) is required to be used to control ONTs. Accordingly, the solutions discussed below solve the problem of how to communicate and provision multiple different network devices that each have different capabilities.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
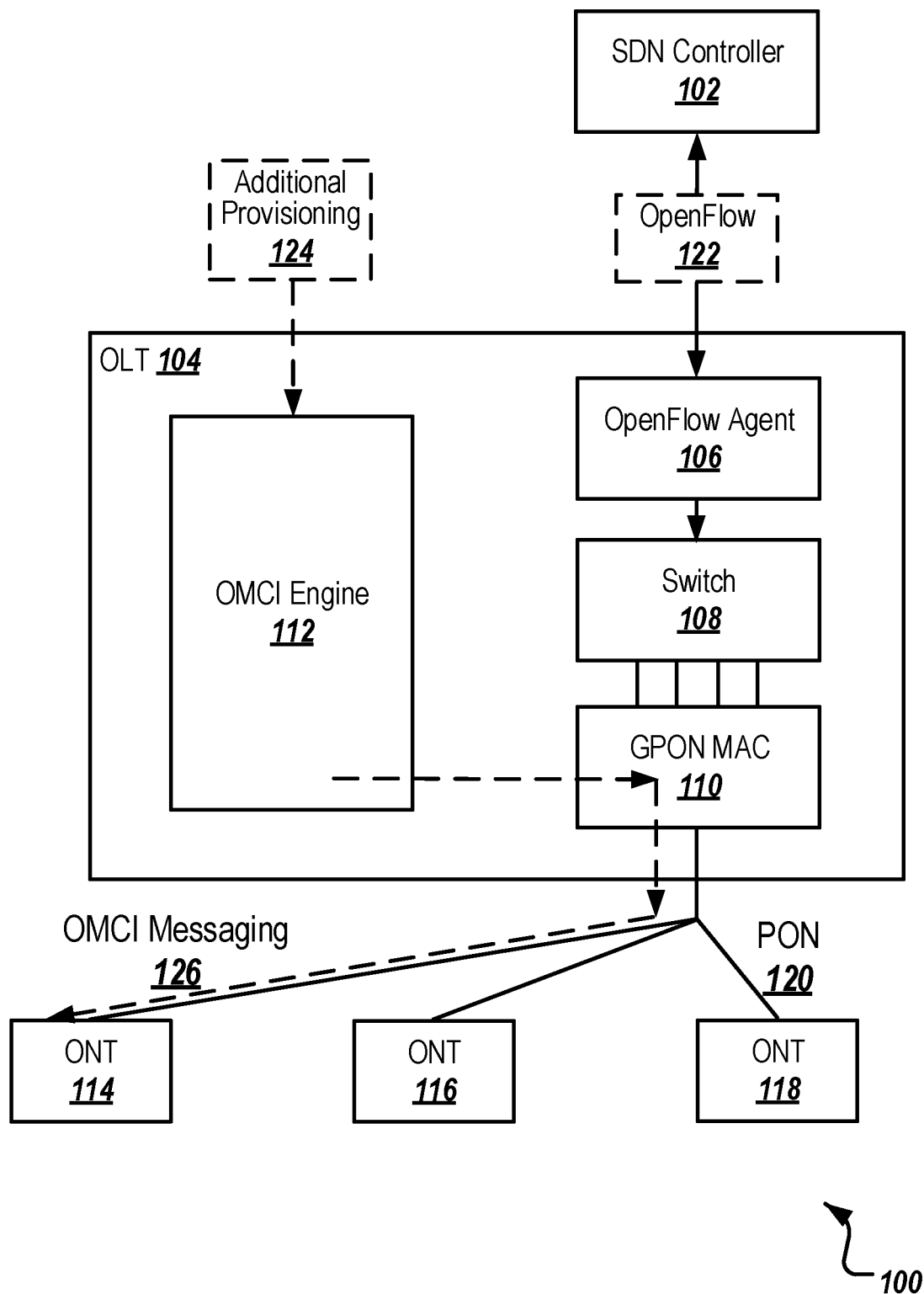
FIG. 1 is a block diagram of an example prior art interaction environment for provisioning an Optical Network Terminal (ONT) in a Software Defined Network (SDN).

This document describes methods, systems, and apparatus for provisioning a legacy network device (e.g., a legacy Optical Network Terminal (ONT)) in a Software Defined Network (SDN). In some implementations, a translation device translates data from a message, received from a controller device (e.g., an SDN controller) and destined for a downstream network device (e.g., an ONT), in order to provision the downstream network device. For example, when the translation device determines that the downstream network device is a legacy network device (e.g., incapable of being provisioned using a particular communications protocol, such as an OpenFlow protocol, of the received message), the translation device translates data from the received message from the communications protocol of the received message to a translated message defined in a different protocol (e.g., an ONT Management and Control Interface (OMCI) protocol) that is required to provision the downstream network device. The translation device then transmits the translated message, instead of the received message, to the downstream network device to provision the downstream network device according to the different protocol. Although this disclosure refers to OpenFlow networks for purposes of example, the subject matter of this document can be applied to other types of SDNs. As such, any specific reference to OpenFlow should be interpreted as also applying to other SDN communication protocols.

In Software Defined Networking, an OpenFlow Protocol allows flow information for packet manipulation and forwarding to be programmed into switches and other network devices. It facilitates packet networks to be programmatically defined and controlled by software applications. In an SDN, flow information is generally exchanged between an SDN controller and an SDN switch using the OpenFlow protocol.

Access networks are transitioning to using Software Defined Networking technology. However, in some access networks, there is a heterogeneous deployment of network devices. Some network devices are capable of communicating in the OpenFlow protocol, while other network devices are not capable of communicating in the OpenFlow protocol. In addition, by specification, some network devices are explicitly managed and/or controlled by a particular type of protocol different from the OpenFlow protocol.

The following disclosure describes several techniques for provisioning a network device in an SDN. In some implementations, when a network device is incapable of being provisioned using an OpenFlow protocol, a translation device translates data from a message, received from a controller device and destined for the network device, from the OpenFlow protocol, to a translated message defined in a different protocol, that is required to provision the network device. The translation device transmits the translated message to the network device according to the different protocol. In some implementations, when another network device is capable of being provisioned using the OpenFlow protocol, the translation device transmits data from the received message, that is destined for the another network device, to the another network device according to the OpenFlow protocol.

FIG. 1 is a block diagram of an example prior art interaction environment 100 for provisioning an Optical Network Terminal (ONT) in a Software Defined Network (SDN). As illustrated in FIG. 1, the interaction environment 100 includes an SDN controller 102 and a Passive Optical Network (PON) 120. The PON 120 includes an Optical Line Terminal (OLT) 104, an Optical Network Terminal (ONT) 114, an ONT 116, and an ONT 118. The OLT 104 includes an OpenFlow agent 106, a switch 108, a Gigabit Passive Optical Network (GPON) MAC 110, and an ONT Management and Control Interface (OMCI) engine 112.

As illustrated in FIG. 1, the PON 120 (e.g., a GPON) includes the OLT 104 and the ONT 114. From a network operator's point of view, the combination of the OLT 104 and the ONT 114 can be considered as a single access device when Software Defined Networking is employed. The OLT 104 can be modified to support OpenFlow. For example, the SDN controller 102 can communicate with the OLT 104, and insert flows into an internal switch (i.e., the switch 108) of the OLT 104 using OpenFlow 122. However, by specification, the ONTs (e.g., the ONTs 114, 116, and 118) are controlled using G.984.4, ONT Management and Control Interface (OMCI). In addition, packet manipulation and/or flow operations are segmented across both the OLT 104 and the ONTs. Virtual LAN (V-LAN) tag manipulations can occur at both the OLT 104 and the ONTs. In addition, upstream traffic classification decisions can be performed by the ONTs, while downstream shaping is normally handled at the OLT 104. If OpenFlow is used for packet flow and manipulation operations within the OLT 104, additional provisioning 124 is used to configure operations of, for example, the ONT 114 using OMCI messaging 126. For example, OpenFlow 122 from the SDN controller 102 is parsed at the OpenFlow agent 106, and the switch 108 in the OLT 104 is provisioned using OpenFlow through the OpenFlow agent 106. However, OMCI is sent separately through the OMCI engine 112 to provision the ONTs. In doing so, the complexity north of the OLT 104 (i.e., towards the SDN controller 102) increases. As a result, the maintenance cost increases, and the overall system is more prone to failure.

Figure 2:
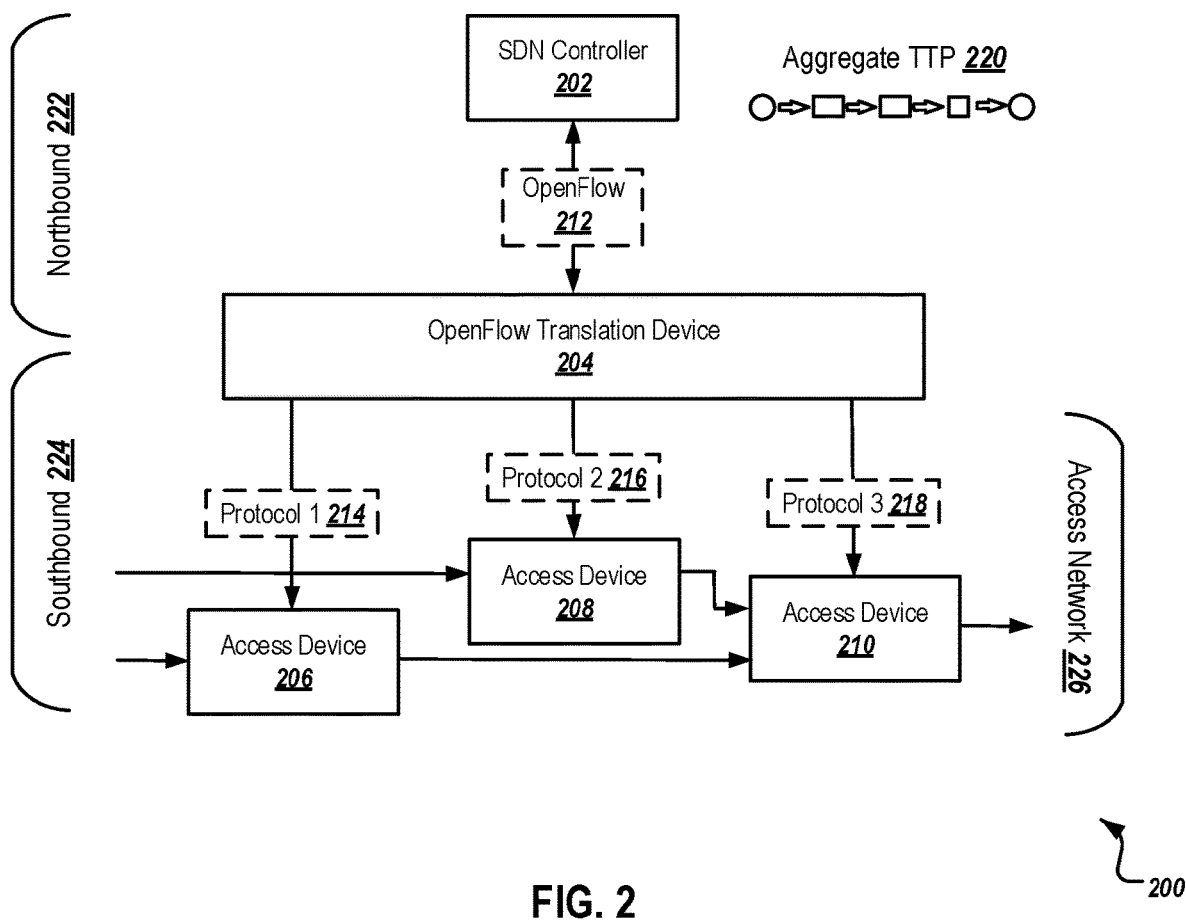
FIG. 2 is a block diagram of an example interaction environment for provisioning a network device in an SDN, according to implementations of the present disclosure.

FIG. 2 is a block diagram of an example interaction environment 200 for provisioning a network device in an SDN, according to implementations of the present disclosure. As illustrated in FIG. 2, the interaction environment 200 includes an SDN controller 202, an OpenFlow translation device 204, and an access network 226. The access network 226 includes an access device 206, an access device 208, and an access device 210. In some implementations, the interaction environment 200 may include additional and/or different components not shown in the block diagram, such as one or more SDN controllers, one or more access devices, or a combination of these and other technologies. In some implementations, components may also be omitted from the interaction environment 200. The components illustrated in FIG. 2 may be similar to, or different from, those described in FIG. 1.

As illustrated in FIG. 2, the OpenFlow translation device 204 is added between the SDN controller 202 and the access network 226. In some implementations, the OpenFlow translation device 204 is configured to present an aggregate Table Type Pattern (TTP) 220. A TTP is defined as a set of tables where flow information is stored. The tables are arranged in a "pipeline" fashion where an output of one table is fed into an input of another table. For example, a circle in the aggregate TTP 220 represents a port (e.g., the circle on the left side is an ingress port, the circle on the right side is an output port), a rectangular in the aggregate TTP 220 represents a table, and a square in the aggregate TTP 220 represents one or more execute actions. In doing so, combinations of matching criteria and instructions for packet handling can be defined for each stage in the pipeline. In some implementations, a software vSwitch (e.g., an Open vSwitch (OVS)) can utilize computer hardware memory, disk storage, and CPU to define an array of TTPs. In some implementations, a hardware-based SDN Switch can be used. When packets are switched in hardware, the TTP for the switch is explicitly defined to match the capabilities of the hardware. For example, the first table in the pipeline allows matching on ingress port, ether type, or outer V-LAN tag, where the actions can be drop, strip V-LAN tag, send to SDN controller, or go to another table in the pipeline. Each stage of the pipeline has an explicit set of matching criteria and actions that are allowable at that stage in the pipeline. At the end of the pipeline, packets can be dropped or manipulated and egressed from a port of the switch. Because the TTP is explicitly defined, a model can be extracted and used within the SDN controller to determine the types of flows that are allowable for that hardware switch at any particular stage of the pipeline.

The aggregate TTP 220 is a TTP northbound 222 of the OpenFlow translation device 204 (i.e., towards the SDN controller 202), and represents aggregate packet manipulation and control capabilities of all network devices (e.g., the access devices 206, 208, and 210) southbound 224 of the OpenFlow translation device 204 (i.e., towards the access network 226). In some implementations, the OpenFlow translation device 204 is configured to translate a model presented within the northbound TTP to a variety of southbound protocols in order to provision the southbound devices using an SDN framework.

At 212, the SDN controller 202 communicates with the OpenFlow translation device 204 using OpenFlow. For example, the SDN controller 202 transmits flow information for packet manipulation and forwarding to be programmed into the access devices 206, 208, and 210. In other words, the SDN controller 202 intends to provision the access devices 206, 208, and 210 using an OpenFlow protocol. In some implementations, the OpenFlow translation device 204 is pretending to be a switch on behalf on various different devices (e.g., the access devices 206, 208, and 210), so that the SDN controller 202 considers communicating with a switch using OpenFlow. In doing so, the OpenFlow translation device 204 enables the SDN controller 202 to provision various different devices using OpenFlow, even when those devices support different protocols other than Open-Flow (e.g., protocol 1, protocol 2, protocol 3) that are required to be used to control those devices.

After receiving a provisioning message defined in the OpenFlow protocol from the SDN controller 202 and destined for the access devices 206, 208, and 210, the Open-Flow translation device 204 may determine that none of the access devices 206, 208, and 210 is capable of being provisioned using the OpenFlow protocol. For example, assume that the OpenFlow translation device 204 determines that the access device 206 is capable of being provisioned using protocol 1, the access device 208 is capable of being provisioned using protocol 2, and the access device 210 is capable of being provisioned using protocol 3.

In response to the determination, the OpenFlow translation device 204 automatically translates the provisioning message defined in the OpenFlow protocol to a translated message defined in a particular protocol that is required to provision a particular access device. For example, the provisioning message defined in the OpenFlow protocol is translated to a translated message defined in protocol 1 for the access device 206, a translated message defined in protocol 2 for the access device 208, and a translated message defined in protocol 3 for the access device 210.

At 214, the OpenFlow translation device 204 transmits the translated message defined in protocol 1 to the access device 206 according to protocol 1. At 216, the OpenFlow translation device 204 transmits the translated message defined in protocol 2 to the access device 208 according to protocol 2. At 218, the OpenFlow translation device 204 transmits the translated message defined in protocol 3 to the access device 210 according to protocol 3. In some implementations, the communications between the OpenFlow translation device 204 and the access devices 206, 208, and 210 use an ONT Management and Control Interface (OMCI) protocol or another appropriate protocol different from the OpenFlow protocol. Using the OpenFlow translation device 204, the SDN controller 202 can, using an OpenFlow protocol, program flow information into access devices that are incapable of being provisioned using the OpenFlow protocol, without modifying the access devices.

In some implementations, the operations performed by the OpenFlow translation device 204 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The OpenFlow translation device 204 can also be implemented as special purpose logic circuitry, for example, a field programmable gate array (FPGA) or an application specific integrated circuit (ASIC).

The OpenFlow translation device 204 can be located anywhere within an SDN. In some implementations, the OpenFlow translation device 204 is co-located with the SDN controller 202. In some implementations, the OpenFlow translation device 204 is co-located with the access network 226. In some implementations, the OpenFlow translation device 204 is located inside the SDN controller 202 as a function of the SDN controller 202. In some implementations, the OpenFlow translation device 204 is located inside, for example, the access device 206 as a function of the access device 206. In some implementations, the OpenFlow translation device 204 is located in a datacenter cloud environment. In some implementations, the OpenFlow translation device 204 can include software, hardware, or a combination of both.

Figure 3:
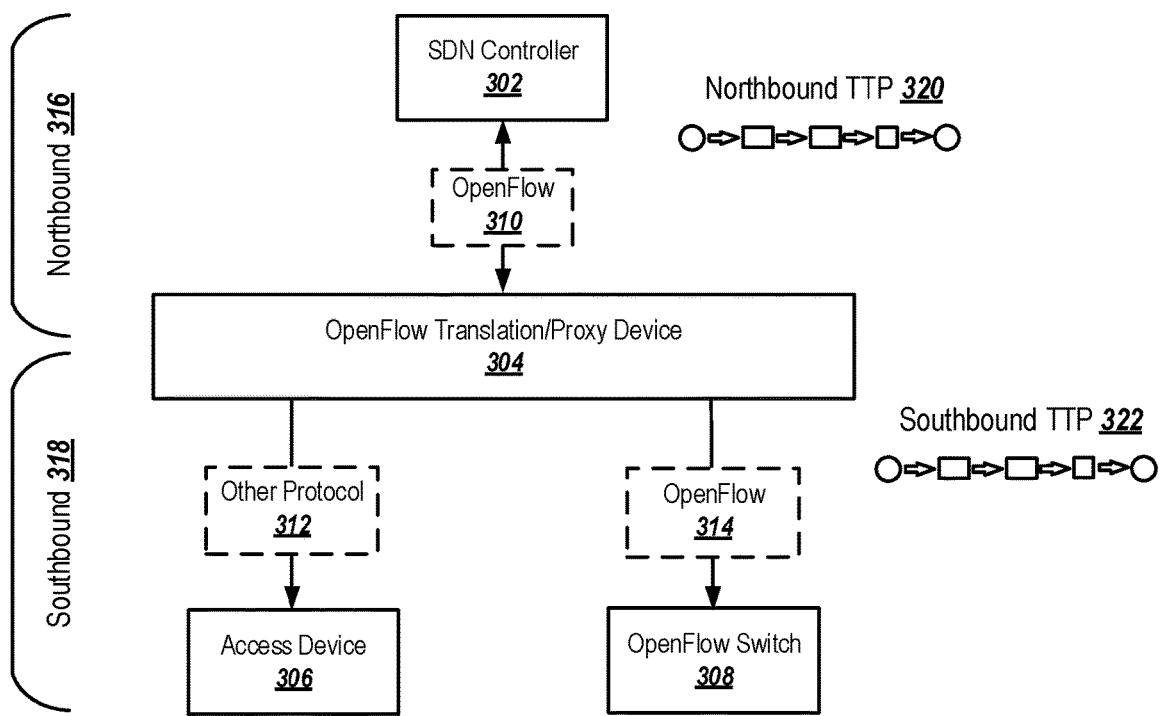
FIG. 3 is a block diagram of another example interaction environment for provisioning a network device in an SDN, according to implementations of the present disclosure.

FIG. 3 is a block diagram of another example interaction environment 300 for provisioning a network device in an SDN, according to implementations of the present disclosure. As illustrated in FIG. 3, the interaction environment 300 includes an SDN controller 302, an OpenFlow translation/proxy device 304, an access device 306, and an OpenFlow switch 308. In some implementations, the interaction environment 300 may include additional and/or different components not shown in the block diagram, such as one or more SDN controllers, one or more access devices, one or more OpenFlow switches, or a combination of these and other technologies. In some implementations, components may also be omitted from the interaction environment 300. The components illustrated in FIG. 3 may be similar to, or different from, those described in FIGS. 1-2.

As illustrated in FIG. 3, the OpenFlow switch 308, southbound 318 of the OpenFlow translation/proxy device 304, is capable of being provisioned using an OpenFlow protocol. However, in this example, the access device 306 is incapable of being provisioned using the OpenFlow protocol. In such a situation, the OpenFlow translation/proxy device 304 acts as both a translation device as well as a proxy device. For example, the OpenFlow translation/proxy device 304 translates OpenFlow messages destined for the access device 306 to other messaging protocol, while transmitting OpenFlow messages destined for the OpenFlow switch 308 without translation.

In some implementations, since one of the southbound 318 protocols is an OpenFlow protocol, two distinct TTPs are presented. For example, a northbound TTP 320, northbound 316 of the OpenFlow translation/proxy device 304 (i.e., towards the SDN controller 302), is presented between the SDN controller 302 and the OpenFlow translation/proxy device 304, and a southbound TTP 322, southbound 318 of the OpenFlow translation/proxy device 304 (i.e., towards the OpenFlow switch 308), is presented between the OpenFlow translation/proxy device 304 and the OpenFlow switch 308.

At 310, the SDN controller 302 communicates with the OpenFlow translation/proxy device 304 using OpenFlow. For example, the SDN controller 302 transmits flow information for packet manipulation and forwarding to be programmed into the access device 306, and the OpenFlow switch 308. In other words, the SDN controller 302 intends to provision the access device 306, and the OpenFlow switch 308 using an OpenFlow protocol.

After receiving a provisioning message defined in the OpenFlow protocol from the SDN controller 302 and destined for the access device 306, and the OpenFlow switch 308, the OpenFlow translation/proxy device 304 determines that the access device 306 is incapable of being provisioned using the OpenFlow protocol, and the OpenFlow switch 308 is capable of being provisioned using the OpenFlow protocol. For example, the OpenFlow translation/proxy device 304 determines that the access device 306 is capable of being provisioned using other protocol (i.e., not the OpenFlow protocol).

In response to the determination, the OpenFlow translation/proxy device 304 automatically translates the provisioning message defined in the OpenFlow protocol to a translated message defined in the other protocol that is required to provision the access device 306. For example, the provisioning message defined in the OpenFlow protocol is translated to a translated message defined in the other protocol for the access device 306. In some implementations, a flow rule in the provisioning message is specified as a set of matching criteria and actions. The OpenFlow translation/proxy device 304 can translate the set of matching criteria and actions to a different flow rule (e.g., over OMCI) to be inserted into a table within the Extended VLAN tagging Managed Entity in an ONT for the appropriate data path. In addition, other types of translations can include translating port information read from SNMP MIBs on a network element to OpenFlow messages sent north to the SDN controller 302.

At 312, the OpenFlow translation/proxy device 304 transmits the translated message defined in the other protocol to the access device 306 according to the other protocol. At 314, the OpenFlow translation/proxy device 304 transmits the received provisioning message defined in the OpenFlow protocol to the OpenFlow switch 308 according to the OpenFlow protocol. In some implementations, the communications between the OpenFlow translation/proxy device 304 and the access device 306 use an ONT Management and Control Interface (OMCI) protocol or other appropriate protocol different from the OpenFlow protocol. Using the OpenFlow translation/proxy device 304, the SDN controller 302 can, using an OpenFlow protocol, program flow information into different network devices, some of which are incapable of being provisioned using the OpenFlow protocol while others are capable of being provisioned using the OpenFlow protocol.

In some implementations, the operations performed by the OpenFlow translation/proxy device 304 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The OpenFlow translation/proxy device 304 can also be implemented as special purpose logic circuitry, for example, a field programmable gate array (FPGA) or an application specific integrated circuit (ASIC).

The OpenFlow translation/proxy device 304 can be located anywhere within an SDN. In some implementations, the OpenFlow translation/proxy device 304 is co-located with the SDN controller 302. In some implementations, the OpenFlow translation/proxy device 304 is co-located with the access device 306. In some implementations, the OpenFlow translation/proxy device 304 is located inside the SDN controller 302 as a function of the SDN controller 302. In some implementations, the OpenFlow translation/proxy device 304 is located inside, for example, the access device 306, as a function of the access device 306. In some implementations, the OpenFlow translation/proxy device 304 is located in a datacenter cloud environment. In some implementations, the OpenFlow translation/proxy device 304 can include software, hardware, or a combination of both.

Figure 4:
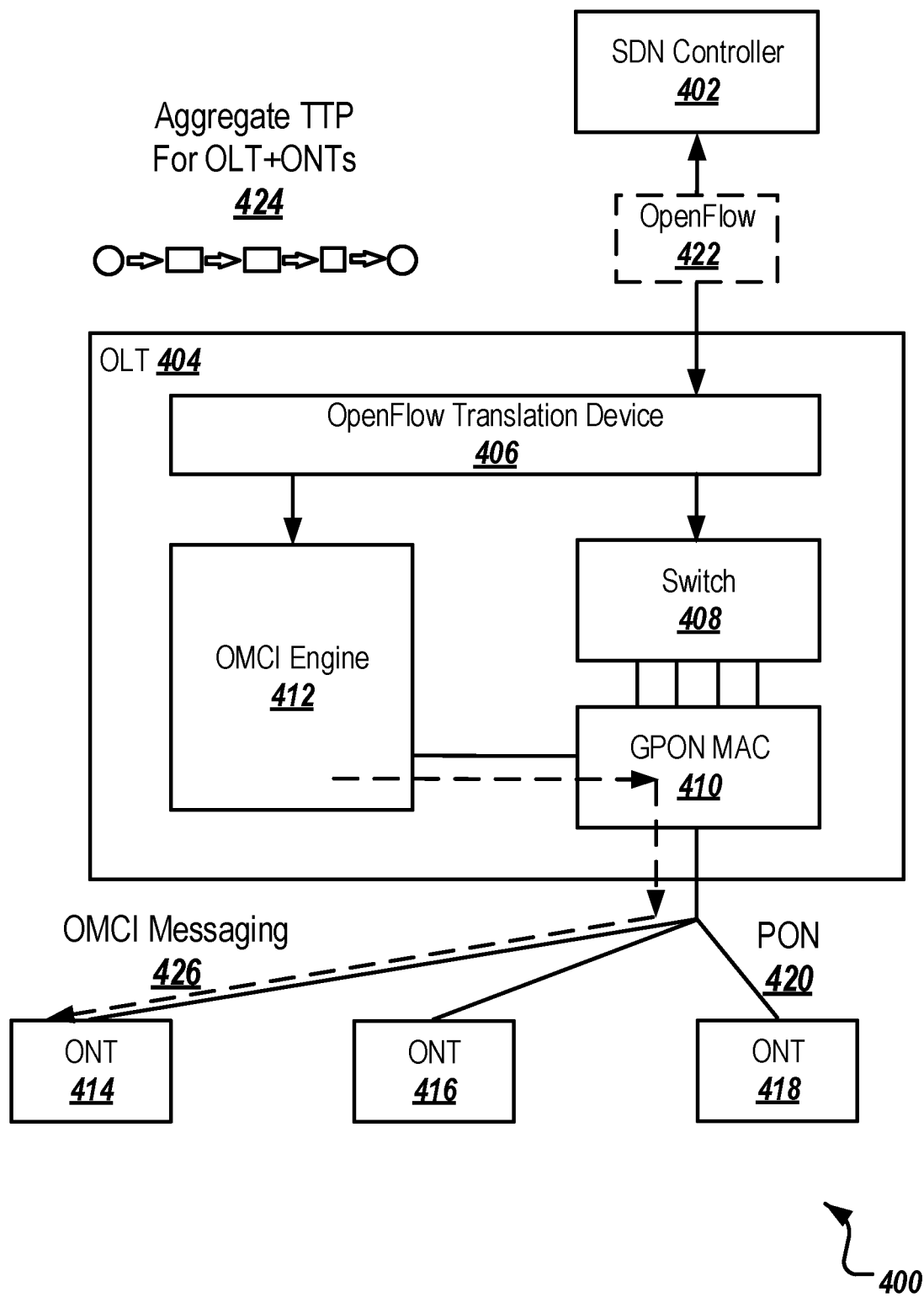
FIG. 4 is a block diagram of an example interaction environment for provisioning an ONT in an SDN, according to implementations of the present disclosure.

FIG. 4 is a block diagram of an example interaction environment 400 for provisioning an ONT in an SDN, according to implementations of the present disclosure. Provisioning an ONT (e.g., an ONT 414) differs from provisioning an ONT (e.g., the ONT 114) described with reference to the prior art interaction environment 100, for example, because the ONT 414 is provisioned without using additional provisioning mechanism. As illustrated in FIG. 4, the interaction environment 400 includes an SDN controller 402 and a Passive Optical Network (PON) 420. The PON 420 includes an Optical Line Terminal (OLT) 404, the ONT 414, an ONT 416, and an ONT 418. The OLT 404 includes an OpenFlow translation device 406, a switch 408, a Gigabit Passive Optical Network (GPON) MAC 410, and an ONT Management and Control Interface (OMCI) engine 412. In some implementations, the interaction environment 400 may include additional and/or different components not shown in the block diagram, such as one or more SDN controllers, one or more OLTs, or a combination of these and other technologies. In some implementations, components may also be omitted from the interaction environment 400. The components illustrated in FIG. 4 may be similar to, or different from, those described in FIGS. 1-3.

As illustrated in FIG. 4, the OpenFlow translation device 406 can be located within the OLT 404. In such a situation, the OpenFlow translation device 406 can directly interact with the switch 408 to program flow entries for packet switching. In addition, the OpenFlow translation device 406 can interact with the OMCI engine 412 to translate received OpenFlow messages from the SDN controller 402 into a format digestible by the OMCI engine 412 to facilitate, for example, traffic classification and tagging.

In some implementations, the OpenFlow translation device 406 is configured to present an aggregate Table Type Pattern (TTP) 424. The aggregate TTP 424 is a TTP for the combination of the OLT 404 and the ONTs 414, 416, and 418. The aggregate TTP 424 represents aggregate packet manipulation and control capabilities of all of the OLT 404 and the ONTs 414, 416, and 418. In some implementations, the OpenFlow translation device 406 is configured to translate a model presented within the aggregate TTP 424 to a variety of protocols in order to provision the ONTs (e.g., the ONTs 414, 416, and 418) using an SDN framework.

At 422, the SDN controller 402 communicates with the OLT 404 using OpenFlow. For example, the SDN controller 402 transmits flow information for packet manipulation and forwarding to be programmed into the ONTs 414, 416, and 418. In other words, the SDN controller 402 intends to provision the ONTs 414, 416, and 418 using an OpenFlow protocol. In some implementations, the OLT 404 has switch chip inside (e.g., the switch 408) and can be configured using OpenFlow. In some implementations, OpenFlow to the switch 408 in the OLT 404 may also need translation due to TTP differences. The switch 408 is still configured using OpenFlow, but contents of OpenFlow messages may be different. Ethernet ports on the ONTs are similar to an Ethernet port on the OLT 404, however, configuration information for the ONTs has to be pushed down by the OLT 404 (e.g., using the OMCI messaging 426).

After receiving a provisioning message defined in the OpenFlow protocol from the SDN controller 402 and destined for the ONTs 414, 416, and 418, the OpenFlow translation device 406 determines that none of the ONTs 414, 416, and 418 is capable of being provisioned using the OpenFlow protocol. For example, the OpenFlow translation device 406 determines that the ONT 414 is capable of being provisioned using an ONT Management and Control Interface (OMCI) protocol.

In response to the determination, the OpenFlow translation device 406 automatically translates the provisioning message defined in the OpenFlow protocol to an OMCI message defined in the OMCI protocol that is required to provision the ONT 414.

At 426, the OpenFlow translation device 406 transmits the OMCI message defined in the OMCI protocol to the ONT 414 according to the OMCI protocol. In some implementations, the communications between the OpenFlow translation device 406 and the ONTs 414, 416, and 418 use other appropriate protocol different from the OpenFlow protocol. Using the OpenFlow translation device 406, the SDN controller 402 can, using an OpenFlow protocol, program flow information into ONTs, that are incapable of being provisioned using the OpenFlow protocol, without modifying the ONTs.

In some implementations, the operations performed by the OpenFlow translation device 406 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The OpenFlow translation device 406 can also be implemented as special purpose logic circuitry, for example, a field programmable gate array (FPGA) or an application specific integrated circuit (ASIC).

Figure 5:
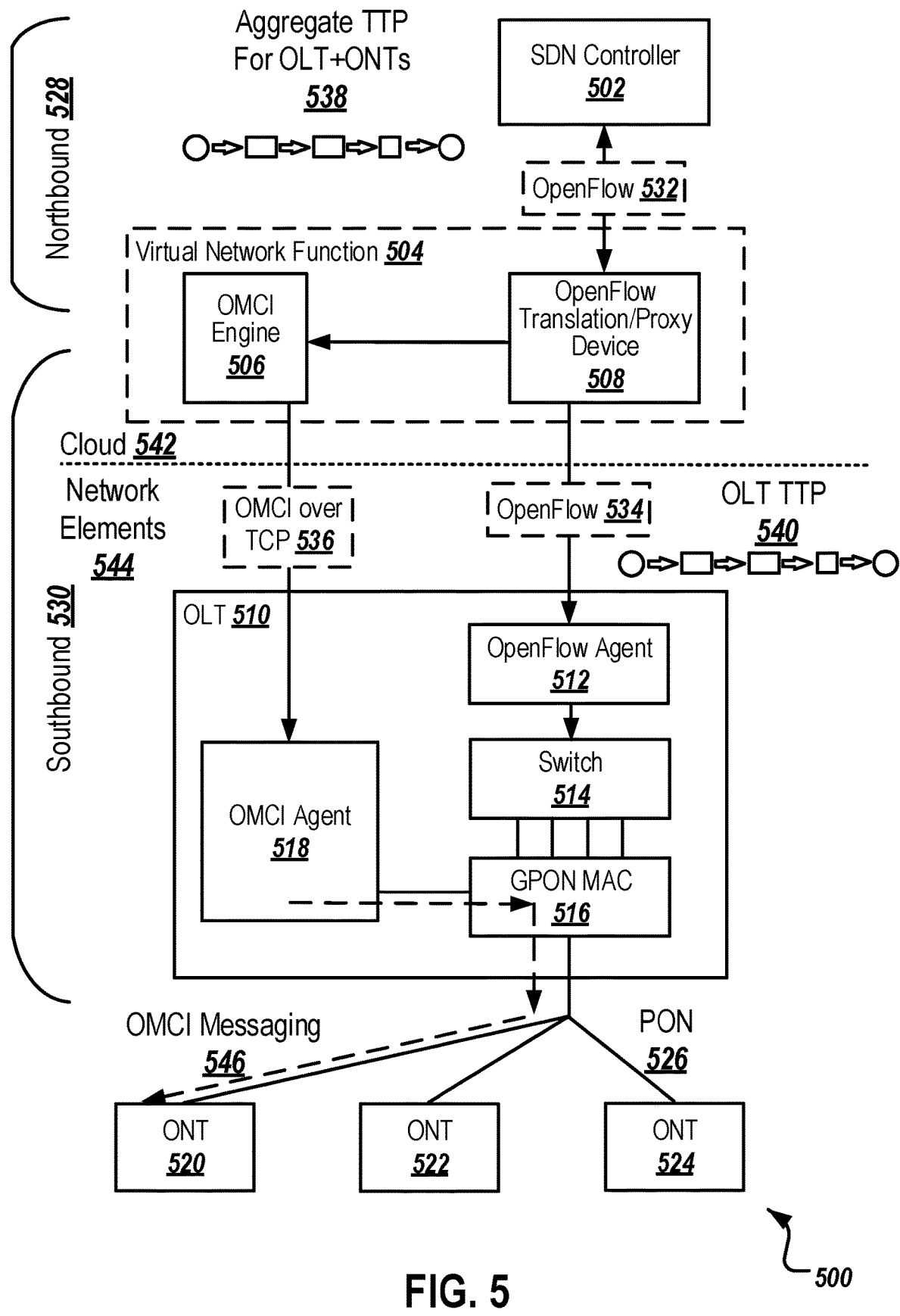
FIG. 5 is a block diagram of another example interaction environment for provisioning an ONT in an SDN, according to implementations of the present disclosure.

FIG. 5 is a block diagram of another example interaction environment 500 for provisioning an ONT in an SDN, according to implementations of the present disclosure. As illustrated in FIG. 5, the interaction environment 500 includes an SDN controller 502, a Virtual Network Function (VNF) 504, and a PON 526. The VNF 504 includes an OMCI engine 506 and an OpenFlow translation/proxy device 508. The PON 526 includes an OLT 510, an ONT 520, an ONT 522, and an ONT 524. The OLT 510 includes an OpenFlow agent 512, a switch 514, a GPON MAC 516, and an OMCI agent 518. In some implementations, the interaction environment 500 may include additional and/or different components not shown in the block diagram, such as one or more SDN controllers, one or more OLTs, or a combination of these and other technologies. In some implementations, components may also be omitted from the interaction environment 500. The components illustrated in FIG. 5 may be similar to, or different from, those described in FIGS. 1-4.

As illustrated in FIG. 5, the OpenFlow translation/proxy device 508 can be extracted from the OLT 510 into the separate VNF 504 that resides in a cloud 542. In some implementations, the OMCI engine 506 can also be extracted from the OLT 510 into the VNF 504 or another VNF not shown in the cloud 542. In such a situation, OpenFlow can be used as a southbound protocol between the OpenFlow translation/proxy device 508 and the OLT 510, thereby allowing the OpenFlow translation/proxy device 508 to serve as a proxy function as well. In addition, the OpenFlow translation/proxy device 508 continues to translate OpenFlow messages into a format digestible by the OMCI engine 506 on behalf of the ONTs connected to the OLT 510.

In some implementations, the OpenFlow translation/proxy device 508 is configured to present an aggregate Table Type Pattern (TTP) 538. The aggregate TTP 538 is a TTP, northbound 528 of the OpenFlow translation/proxy device 508 (i.e., towards the SDN controller 502), for the combination of the OLT 510 and the ONTs 520, 522, and 524. The aggregate TTP 538 represents aggregate packet manipulation and control capabilities of all of the OLT 510 and the ONTs 520, 522, and 524. In some implementations, an OLT TTP 540, southbound 530 of the OpenFlow translation/proxy device 508 (i.e., towards the network elements 544), is presented between the OpenFlow translation/proxy device 508 and the ONT 520.

At 532, the SDN controller 502 communicates with the OpenFlow translation/proxy device 508 using OpenFlow. For example, the SDN controller 502 transmits flow information for packet manipulation and forwarding to be programmed into the ONTs 520, 522, and 524. In other words, the SDN controller 502 intends to provision the ONTs 520, 522, and 524 using an OpenFlow protocol.

After receiving a provisioning message defined in the OpenFlow protocol from the SDN controller 502 and destined for the ONTs 520, 522, and 524, the OpenFlow translation/proxy device 508 determines that none of the ONTs 520, 522, and 524 is capable of being provisioned using the OpenFlow protocol, and the switch 514 is capable of being provisioned using the OpenFlow protocol. For example, the OpenFlow translation/proxy device 508 determines that the ONT 520 is capable of being provisioned using an ONT Management and Control Interface (OMCI) protocol.

In response to the determination, the OpenFlow translation/proxy device 508 automatically translates, through the OMCI engine 506, the provisioning message defined in the OpenFlow protocol to a translated message defined in an OMCI over Transmission Control Protocol (TCP) that is required to provision the ONT 520. For example, the provisioning message defined in the OpenFlow protocol is translated to a translated message defined in the OMCI over TCP for the ONT 520.

At 536, the OMCI engine 506 transmits the translated message defined in the OMCI over TCP to the OMCI agent 518 in the OLT 510. At 534, the OpenFlow translation/proxy device 508 transmits the received provisioning message defined in the OpenFlow protocol to the OpenFlow agent 512 in the OLT 510 according to the OpenFlow protocol. In some implementations, OpenFlow to the switch 514 in the OLT 510 may also need translation due to TTP differences. The switch 514 is still configured using OpenFlow, but contents of OpenFlow messages may be different.

At 546, the OLT 510 transmits an OMCI message defined in the OMCI protocol to the ONT 520 according to the OMCI protocol. Using the OpenFlow translation/proxy device 508, the SDN controller 502 can, using an OpenFlow protocol, program flow information into the OLT 510, and the ONTs 520, 522, and 524 without modifying the ONTs 520, 522, and 524.

In some implementations, the operations performed by the OpenFlow translation/proxy device 508 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The OpenFlow translation/proxy device 508 can also be implemented as special purpose logic circuitry, for example, a field programmable gate array (FPGA) or an application specific integrated circuit (ASIC).

Figure 6:
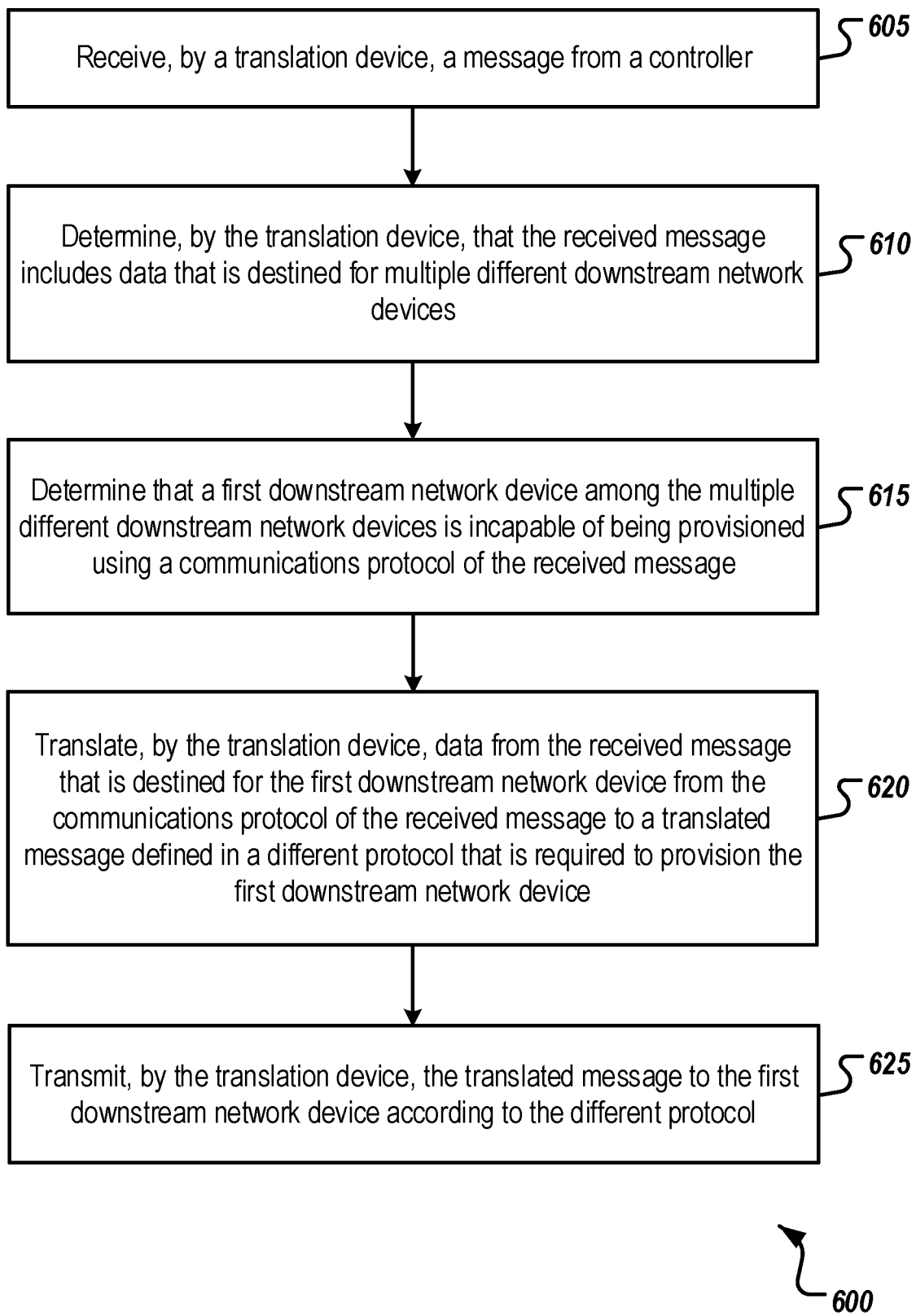
FIG. 6 is a flow chart of an example method for provisioning a network device in an SDN, according to implementations of the present disclosure.

FIG. 6 is a flow chart of an example method 600 for provisioning a network device in an SDN, according to implementations of the present disclosure. The example method 600 can be performed, for example, by one or more telecommunications devices, such as those described with reference to FIGS. 2-5 (e.g., the OpenFlow translation device 204, the OpenFlow translation/proxy device 304, the OpenFlow translation device 406, the OpenFlow translation/proxy device 508). The example method 600 can also be implemented as instructions stored on a non-transitory, computer-readable medium that, when executed by one or more telecommunications devices (and/or data processing apparatus), configures the one or more telecommunications devices to perform and/or cause the one or more telecommunications devices to perform the actions of the example method 600.

A message is received by a translation device from a controller (605). In some implementations, the message is defined in an OpenFlow protocol and is used by the controller to provision one or more downstream network devices. In some implementations, the translation device is an OpenFlow translation device or an OpenFlow translation/proxy device. In some implementations, the controller is an SDN controller.

A determination is made, by the translation device, that the received message includes data that is destined for multiple different downstream network devices (610). For example, the determination can be made based on the destination addresses (e.g., IP addresses) of the received message. In some implementations, the message is an OpenFlow message and the multiple different downstream network devices include at least one downstream OpenFlow network device. For example, the OpenFlow message received from the controller is transmitted, by the translation device, to each downstream OpenFlow network device without translating the OpenFlow message to a protocol different than an OpenFlow protocol. In some implementations, the OpenFlow message is translated into a different OpenFlow message (e.g., with different contents) before transmitted to a downstream OpenFlow network device due to differences in northbound and southbound TTPs.

In some implementations, the multiple different downstream network devices include an Optical Network Terminal (ONT) that is required to be provisioned using an ONT Management and Control Interface (OMCI) protocol message rather than the OpenFlow protocol. For example, data from the received OpenFlow message, that is destined for the ONT, is translated from the OpenFlow protocol to a translated message defined in the OMCI protocol.

In some implementations, the multiple different downstream network devices include an Optical Line Terminal (OLT), and the translation device is included in the OLT or located in a cloud computing environment with which the OLT communicates.

A determination is made that a first downstream network device among the multiple different downstream network devices is incapable of being provisioned using a communications protocol of the received message (615). For example, the determination can be made based on a communications protocol, previously used by the translation device to communicate with the first downstream network device, being different from the communications protocol of the received message. In some implementations, different downstream network devices are represented as different tables in the pipeline of the northbound TTP. As a result, the determination can be made based on the design of the northbound TTP and the particular rules being inserted into the particular tables in the pipeline of the northbound TTP.

Data from the received message, that is destined for the first downstream network device, is translated, by the translation device, from the communications protocol of the received message to a translated message defined in a different protocol that is required to provision the first downstream network device (620). In some implementations, translating data from the received message includes various activities. For example, a Table Type Pattern (TTP), specifying matching rules and actions that control provisioning of downstream network devices that are incapable of being provisioned using the communications protocol of the received message, is accessed. A determination is made, by the translation device, that a set of data in the received message matches an entry in the TTP. An action is determined, by the translation device, that is mapped to the entry in the TTP. For example, the action can be drop, strip V-LAN tag, send to SDN controller, or go to another table in the TTP. The action, that is mapped to the entry in the TTP, is performed by the first downstream network device instructed by the translation device. In some implementations, performing the action includes accessing a different table in the TTP that is specified by the action that is mapped to the entry in the TTP. For example, if a second downstream network device is represents as the different table in the TTP, packets are moved from the first downstream network device to the second downstream network device.

The translated message is transmitted, by the translation device, to the first downstream network device according to the different protocol (625). For example, the first downstream network device is provisioned using the translated message. In some implementations, the multiple different downstream network devices are deployed as part of a Gigabit Passive Optical Network (GPON) including an Optical Line Terminal (OLT) and an Optical Network Terminal (ONT). In some implementations, the multiple different downstream network devices are deployed as part of an Ethernet Passive Optical Network, a 10-Gigabit-capable Passive Optical Network (XG-PON), a Next-Generation Passive Optical Network 2 (NG-PON2), or other type of a Passive Optical Network (PON).

The example method 600 shown in FIG. 6 can be modified or reconfigured to include additional, fewer, or different actions (not shown in FIG. 6), which can be performed in the order shown or in a different order. For example, after 625, a determination is made that a second downstream network device among the multiple different downstream network devices is capable of being provisioned using the communications protocol of the received message. For example, the determination can be made based on a communications protocol, previously used by the translation device to communicate with the second downstream network device, being different from the communications protocol of the received message. In response to the determination, data from the received message, that is destined for the second downstream network device, is transmitted, by the translation device, to the second downstream network device according to the communications protocol of the received message without translating the data from the received message. In some implementations, one or more of the actions shown in FIG. 6 can be repeated or iterated, for example, until a terminating condition is reached. In some implementations, one or more of the individual actions shown in FIG. 6 can be executed as multiple separate actions, or one or more subsets of the actions shown in FIG. 6 can be combined and executed as a single action. In some implementations, one or more of the individual actions shown in FIG. 6 may also be omitted from the example method 600.

Figure 7:
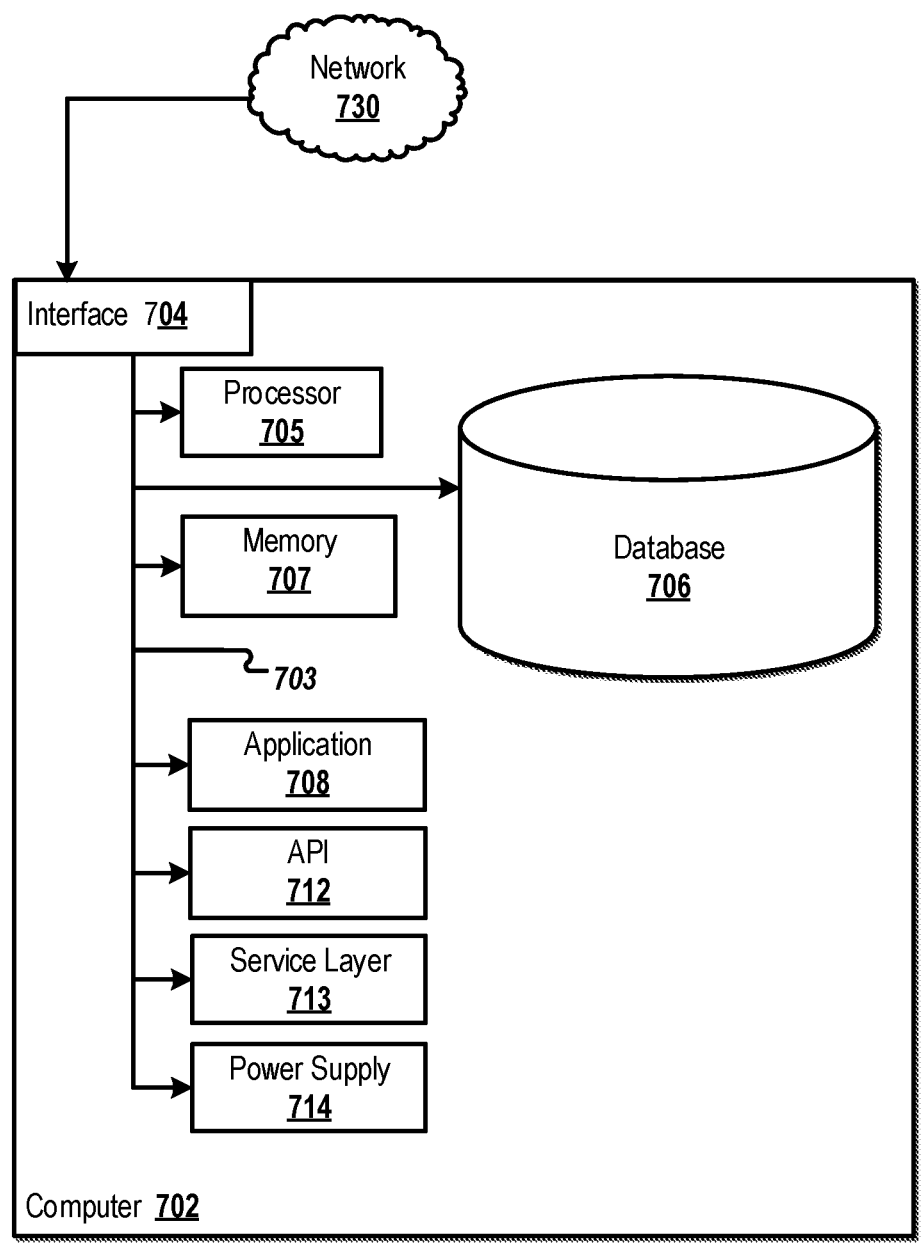
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
   receiving, by a translation device, an OpenFlow message from a controller, wherein the OpenFlow message is formatted according to an OpenFlow communications protocol;
   determining, by the translation device, the received OpenFlow message includes data destined for multiple different downstream network devices, wherein the multiple different downstream network devices includes a first downstream network device and a second downstream network device;
   determining the first downstream network device among the multiple different downstream network devices is incapable of being provisioned using the OpenFlow communications protocol of the received OpenFlow message, but the second downstream network device is capable of being provisioned using the OpenFlow communications protocol of the received OpenFlow message;
   transmitting, by the translation device, the OpenFlow message, as formatted according to the OpenFlow communications protocol, to the second downstream network device based on the determination the second downstream network device is capable of being provisioned using the OpenFlow communications protocol;
   translating, by the translation device, data from the received OpenFlow message destined for the first downstream network device from the OpenFlow communications protocol of the received OpenFlow message to a translated message defined in a different protocol required to provision the first downstream network device based on the determination the first downstream network device is incapable of being provisioned using the OpenFlow communications protocol; and transmitting, by the translation device, the translated message to the first downstream network device according to the different protocol; wherein:

the multiple different downstream network devices include additional downstream OpenFlow network devices, the method further comprising transmitting, by the translation device, the OpenFlow message received from the controller to each downstream OpenFlow network device among the additional downstream OpenFlow network devices without translating the received OpenFlow message to a protocol different than the OpenFlow protocol;

receiving the OpenFlow message from the controller comprises receiving the OpenFlow message from a Software Defined Network ("SDN") controller;

the translation device presents a northbound Table Type Pattern (TTP) that differs from a southbound TTP presented by the translation device to facilitate communications between the SDN controller and the multiple different downstream network devices;

the northbound TTP is used for communications toward the SDN controller; and the southbound TTP is used for communications toward the multiple different downstream network devices.

2. The method of claim 1, wherein the multiple different downstream network devices include an Optical Network Terminal (ONT) required to be provisioned using an ONT Management and Control Interface (OMCI) protocol message rather than the OpenFlow protocol, the method further comprising translating data from the received OpenFlow message destined for the ONT from the OpenFlow protocol to a translated message defined in the OMCI protocol.

3. The method of claim 2, wherein the multiple different downstream network devices include an Optical Line Terminal (OLT), and the translation device is included in the OLT or located in a cloud computing environment with which the OLT communicates.

4. The method of claim 1, wherein the translating, by the translation device, data from the received OpenFlow message destined for the first downstream network device from the OpenFlow communications protocol of the received OpenFlow message to a translated message defined in a different protocol required to provision the first downstream network device comprises:

accessing a Table Type Pattern (TTP) specifying matching rules and actions that control provisioning of downstream network devices incapable of being provisioned using the OpenFlow communications protocol of the received OpenFlow message;

determining, by the translation device, a set of data in the received OpenFlow message matches an entry in the TTP;

determining, by the translation device, an action mapped to the entry in the TTP; and instructing, by the translation device, the first downstream network device to perform the action mapped to the entry in the TTP.

5. The method of claim 4, wherein performing the action comprises accessing a different table in the TTP specified by the action mapped to the entry in the TTP.

6. The method of claim 1, wherein the multiple different downstream network devices are deployed as part of a Gigabit Passive Optical Network (GPON) including an Optical Line Terminal (OLT) and an Optical Network Terminal (ONT).

7. A telecommunications device, comprising:

a memory; and one or more processors coupled to the memory, wherein the one or more processors are configured to perform operations comprising:

receiving an OpenFlow message from a controller, wherein the OpenFlow message is formatted according to an OpenFlow communications protocol;

determining the received OpenFlow message includes data that is destined for multiple different downstream network devices, wherein the multiple different downstream network devices includes a first downstream network device and a second downstream network device;

determining the first downstream network device among the multiple different downstream network devices is incapable of being provisioned using the OpenFlow communications protocol of the received OpenFlow message, but the second downstream network device is capable of being provisioned using the OpenFlow communications protocol of the received OpenFlow message;

transmitting the OpenFlow message, as formatted according to the OpenFlow communications protocol, to the second downstream network device based on the determination the second downstream network device is capable of being provisioned using the OpenFlow communications protocol;

translating data from the received OpenFlow message destined for the first downstream network device from the OpenFlow communications protocol of the received OpenFlow message to a translated message defined in a different protocol required to provision the first downstream network device based on the determination the first downstream network device is incapable of being provisioned using the OpenFlow communications protocol; and transmitting the translated message to the first downstream network device according to the different protocol; wherein:

the multiple different downstream network devices include additional downstream OpenFlow network devices, the operations further comprising transmitting the OpenFlow message received from the controller to each downstream OpenFlow network device among the additional downstream OpenFlow network devices without translating the received OpenFlow message to a protocol different than the OpenFlow protocol;

receiving the OpenFlow message from the controller comprises receiving the OpenFlow message from a Software Defined Network ("SDN") controller;

the telecommunications device presents a northbound Table Type Pattern (TTP) that differs from a southbound TTP presented by the telecommunications device to facilitate communications between the SDN controller and the multiple different downstream network devices;

the northbound TTP is used for communications toward the SDN controller; and the southbound TTP is used for communications toward the multiple different downstream network devices.

8. The telecommunications device of claim 7, wherein the multiple different downstream network devices include an Optical Network Terminal (ONT) required to be provisioned using an ONT Management and Control Interface (OMCI) protocol message rather than the OpenFlow protocol, the operations further comprising translating data from the received OpenFlow message destined for the ONT from the OpenFlow protocol to a translated message defined in the OMCI protocol.

9. The telecommunications device of claim 8, wherein the multiple different downstream network devices include an Optical Line Terminal (OLT), and the telecommunications device is included in the OLT or located in a cloud computing environment with which the OLT communicates.

10. The telecommunications device of claim 7, wherein the translating data from the received OpenFlow message destined for the first downstream network device from the OpenFlow communications protocol of the received OpenFlow message to a translated message defined in a different protocol required to provision the first downstream network device comprises:
    accessing a Table Type Pattern (TTP) specifying matching rules and actions that control provisioning of downstream network devices incapable of being provisioned using the OpenFlow communications protocol of the received OpenFlow message;
    determining a set of data in the received OpenFlow message matches an entry in the TTP;
    determining an action mapped to the entry in the TTP; and
    instructing the first downstream network device to perform the action mapped to the entry in the TTP.

11. The telecommunications device of claim 10, wherein performing the action comprises accessing a different table in the TTP specified by the action mapped to the entry in the TTP.

12. The telecommunications device of claim 7, wherein the multiple different downstream network devices are deployed as part of a Gigabit Passive Optical Network (GPON) including an Optical Line Terminal (OLT) and an Optical Network Terminal (ONT).

13. A telecommunications system, comprising:
    a controller device; and
    a translation device configured to perform operations comprising:
        receiving an OpenFlow message from the controller device, wherein the OpenFlow message is formatted according to an OpenFlow communications protocol;
        determining the received OpenFlow message includes data destined for multiple different downstream network devices, wherein the multiple different downstream network devices includes a first downstream network device and a second downstream network device;
        determining the first downstream network device among the multiple different downstream network devices is incapable of being provisioned the OpenFlow communications protocol of the received OpenFlow message, but the second downstream network device is capable of being provisioned using the OpenFlow communications protocol of the received OpenFlow message;
        transmitting the OpenFlow message, as formatted according to the OpenFlow communications protocol, to the second downstream network device based on the determination the second downstream network device is capable of being provisioned using the OpenFlow communications protocol;
        translating data from the received OpenFlow message destined for the first downstream network device from the OpenFlow communications protocol of the received OpenFlow message to a translated message defined in a different protocol required to provision the first downstream network device based on the determination the first downstream network device is incapable of being provisioned using the OpenFlow communications protocol; and
        transmitting the translated message to the first downstream network device according to the different protocol; wherein:
            the multiple different downstream network devices include additional downstream OpenFlow network devices, the operations further comprising transmitting the OpenFlow message received from the controller to each downstream OpenFlow network device among the additional downstream OpenFlow network devices without translating the received OpenFlow message to a protocol different than the OpenFlow protocol;
            receiving the OpenFlow message from the controller comprises receiving the OpenFlow message from a Software Defined Network ("SDN") controller;
            the translation device presents a northbound Table Type Pattern (TTP) that differs from a southbound TTP presented by the translation device to facilitate communications between the SDN controller and the multiple different downstream network devices;
            the northbound TTP is used for communications toward the SDN controller; and
            the southbound TTP is used for communications toward the multiple different downstream network devices.

14. The telecommunications system of claim 13, wherein the multiple different downstream network devices include an Optical Network Terminal (ONT) required to be provisioned using an ONT Management and Control Interface (OMCI) protocol message rather than the OpenFlow protocol, the operations further comprising translating data from the received OpenFlow message destined for the ONT from the OpenFlow protocol to a translated message defined in the OMCI protocol.

\* \* \* \* \*